United States Patent
Koefod

(10) Patent No.: US 12,404,194 B2
(45) Date of Patent: Sep. 2, 2025

(54) SYSTEMS AND METHODS FOR TREATMENT OF HARD WATER

(71) Applicant: Cargill, Incorporated, Wayzata, MN (US)

(72) Inventor: Robert Scott Koefod, Maple Grove, MN (US)

(73) Assignee: CARGILL, INCORPORATED, Wayzata, MN (US)

(*) Notice: Subject to any disclaimer, the term of this patent is extended or adjusted under 35 U.S.C. 154(b) by 476 days.

(21) Appl. No.: 17/759,736

(22) PCT Filed: Jan. 29, 2021

(86) PCT No.: PCT/US2021/015654
§ 371 (c)(1),
(2) Date: Jul. 29, 2022

(87) PCT Pub. No.: WO2021/155110
PCT Pub. Date: Aug. 5, 2021

(65) Prior Publication Data
US 2023/0108978 A1    Apr. 6, 2023

Related U.S. Application Data

(60) Provisional application No. 62/968,486, filed on Jan. 31, 2020.

(51) Int. Cl.
C02F 1/42 (2023.01)
C02F 5/02 (2023.01)
C02F 5/08 (2023.01)

(52) U.S. Cl.
CPC .................. *C02F 5/02* (2013.01); *C02F 1/42* (2013.01); *C02F 5/08* (2013.01);
(Continued)

(58) Field of Classification Search
CPC ...... C02F 5/02; C02F 1/42; C02F 5/08; C02F 2209/055; C02F 2209/40; C02F 2301/043;
(Continued)

(56) References Cited

U.S. PATENT DOCUMENTS 2,749,305 A * 6/1956 Jursich ..................... C02F 5/12
210/698
4,622,133 A * 11/1986 Furuno ..................... B01J 39/00
210/96.1
(Continued)

FOREIGN PATENT DOCUMENTS

CA    2731694 A1 *  2/2010  ............. B01J 47/14
CA    3107306 A1    2/2020
(Continued)

OTHER PUBLICATIONS

Georgiou et al., "Removal and/or prevention of limescale in plumbing tubes by a radio-frequency alternating electric field inductance device" Journal of water process engineering. Apr. 2018;22:34-40.
(Continued)

*Primary Examiner* — Joseph W Drodge

(57) ABSTRACT

Systems and methods for treatment of hard water are disclosed that relate to combining a scale reduction device with a water softener device. In an aspect, the water softener device is an ion exchange water softener device. The systems and methods can be used to provide treated water having the same or similar performance quality compared to water produced by ion exchange water softener devices alone, while using significantly less chemical regenerant.

12 Claims, 4 Drawing Sheets

(52) U.S. Cl.
CPC .... *C02F 2209/055* (2013.01); *C02F 2209/40* (2013.01); *C02F 2301/043* (2013.01)

(58) Field of Classification Search
CPC .... C02F 1/48; C02F 5/086; C02F 5/00; C02F 5/025; C02F 2001/422; C02F 2001/425; C02F 2001/427
See application file for complete search history.

(56) References Cited

U.S. PATENT DOCUMENTS

| | | | |
|---|---|---|---|
| 5,232,953 A * | 8/1993 | Johnson | B01J 49/75 210/678 |
| 6,258,250 B1 | 7/2001 | Weissenbacher | |
| 9,879,120 B2 | 1/2018 | Koslow | |
| 9,896,364 B2 | 2/2018 | Smith | |
| 2006/0096920 A1 * | 5/2006 | Ayala | C02F 1/44 210/639 |
| 2008/0237138 A1 * | 10/2008 | Moore | C02F 5/02 210/93 |
| 2008/0274939 A1 | 11/2008 | Monsrud | |
| 2009/0211919 A1 * | 8/2009 | Hegel | C02F 1/42 205/633 |
| 2011/0067732 A1 * | 3/2011 | Smith | C11D 3/3942 134/109 |
| 2012/0211419 A1 * | 8/2012 | Koslow | C08J 3/07 521/30 |
| 2015/0360988 A1 | 12/2015 | Tao et al. | |
| 2020/0331786 A1 | 10/2020 | Monsrud | |

FOREIGN PATENT DOCUMENTS

| | | |
|---|---|---|
| WO | 2013151618 W | 10/2013 |
| WO | 2016094027 W | 6/2016 |

OTHER PUBLICATIONS

Zarei et al., "Softening hard water using high frequency spark plasma discharge" Plasma chemistry and plasma processing, 37, pp. 99-114, Jan. 2017.

* cited by examiner

SYSTEMS AND METHODS FOR TREATMENT OF HARD WATER

CROSS REFERENCE TO RELATED APPLICATIONS

This application is a national phase application of PCT/US2021/015654, filed 29 Jan. 2021, entitled SYSTEMS AND METHODS FOR TREATMENT OF HARD WATER which claims the benefit of U.S. Provisional Patent Application No. 62/968,486, filed 31 Jan. 2020, entitled SYSTEMS AND METHODS FOR TREATMENT OF HARD WATER which are hereby incorporated by reference in their entirety.

BACKGROUND

Water is termed "hard" when it contains a significant concentration of polyvalent metal ions, particularly calcium and magnesium. Hard water creates numerous problems. In homes, it causes unsightly scale deposits on fixtures, faucets, and sinks. It causes scale formation in pipes and on the heating elements of water heaters, leading to reduced energy efficiency and lifetime. Hard water scale clogs shower heads. It reduces the effectiveness of detergents for dishwashing and laundry and causes spotting of glasses and dishes. It leaves a sticky soap film on skin and hair. Hard water is also a problem in industrial applications where scale formation reduces the efficiency and lifetime of heat exchangers, boilers, and other equipment.

In order to deal with the problems caused by hard water, a variety of technologies are used that either remove the hardness ions from the water or inhibit the ability of the hardness ions to form scale. Hard water is sometimes chemically softened (e.g., by lime softening) in municipal water treatment plants, but in many areas the municipal water supply sent to homes and other buildings is hard. Also, homes and buildings that rely on private wells often have incoming water that is hard. In such cases, point of entry or point of use devices are often used to treat the water to reduce the detrimental effects of hardness. Membrane based technologies, such as reverse osmosis and nanofiltration, have been adapted for point of use and point of entry water softening (i.e., for the removal of hardness ions from the water), but the most commonly used devices for point of entry treatment of hard water are ion exchange water softeners.

Ion exchange water softeners have the advantage of being relatively low cost, highly effective and very efficient in water use. However, an undesirable aspect of typical point of entry water softeners is that they require salt for regeneration. This can be a nuisance for users who must periodically purchase and transport heavy bags of salt to their water softener. Additionally, these water softeners discharge chlorides to wastewater during regeneration which may contribute to undesirable environmental impact. Some users also dislike the "slippery" feeling of ion exchange softened water while showering. Membrane based softeners have the advantage that they do not require the use or discharge of chloride salts and do not create "slippery" feeling water during showering, but they are generally much more expensive than ion exchange softeners, have much lower water use efficiency, and require remineralization of the softened water to avoid corrosion problems.

In response to the limitations of technologies that soften water (i.e., that remove hardness ions), a variety of alternative devices have been developed that do not necessarily remove hardness ions from the water, but instead inhibit the ability of hard water to form scale. Some of these devices do not require salt to inhibit the formation of scale. Commercial devices of this type are sometimes referred to as "no salt water softeners," but are more accurately termed "water conditioners" or "scale reduction devices." A variety of point of use and point of entry scale reduction devices have been commercialized based on several different technological approaches, including physical scale inhibition, chemical scale inhibition, and magnetic or electromagnetic scale inhibition.

Hard water scaling occurs when minerals precipitate from the water, often due to a drop in their solubility when the water is heated, as the major hardness mineral, calcium carbonate, has an inverse solubility temperature relationship. When calcium carbonate deposits directly on a surface, such as a heating element, it can often form a very adherent scale that is difficult to remove. Thus, one way to reduce scaling is to cause the hardness minerals to precipitate or flocculate from the water before the water comes in contact with pipe or heating element surfaces. This approach is utilized in one of the more common types of scale reduction devices based on a technology referred to as Template Assisted Crystallization or Nucleation Assisted Crystallization.

The Template Assisted Crystallization (TAC) process does not soften water in the strict sense, i.e., it does not actually remove the hardness minerals from the water as ion exchange water and membrane devices do. Instead, a device based on the TAC process is a scale reduction device. TAC units have the advantage that they do not require the use of other chemicals, do not require electricity, and do not produce any new chemical discharge to burden wastewater treatment systems or cause direct chemical environmental impact. They are relatively simple to operate because they do not require any regeneration cycle: the hard water simply flows through a tank containing the TAC medium. The TAC medium provides nucleation sites which catalyze the crystallization of calcium carbonate as nano- or micro-crystals which tend to remain suspended in the water rather than depositing as scale on substrate surfaces. Some examples of commercial TAC media include Eagle®sorb ES3 Anti-Scale, OneFlow®, Next™ Scale Stop, and Filtersorb® SP3 media.

Another technology utilized in some devices is chemical scale reduction through chelation. Chelation involves adding a chemical called a "chelant" to the water that can bind to the hardness ions, resulting in a chemically modified ion with enhanced solubility that resists precipitation and thereby has a reduced tendency to form scale and interfere with detergents. A class of hard water treatment devices has been developed that utilizes chelants to minimize the negative effects of hard water. Polyphosphates are among the most well-known and commonly used chelants for treating hard water. The original active ingredient in Calgon® water softener, for example, was sodium hexametaphosphate (SHMP), a polyphosphate. Complete chemical softening of water requires relatively high concentrations of chelant because there must be sufficient chelant present to stoichiometrically react with all of the hardness ions above a given concentration (e.g., 1 gpg). For example, it takes about 5-10 ppm polyphosphate to fully soften each 1 ppm of hardness ions.

Some scale reduction devices make use of a cartridge containing a slowly soluble polyphosphate such as the commercial products "Slow Phos" or "Siliphos®." Slow-Phos (produced by SPER Chemical Corporation) is a glassy sodium calcium polyphosphate. Siliphos® is a glassy polyphosphate containing silica. Both are designed to be loaded into flow-through cartridges and continually dissolve to provide a steady, low dose of polyphosphate scale inhibitor. Aquios is one manufacturer of water treatment devices based on Siliphos®. NuvoH2O® is another commercial scale reduction device based on chelation technology, utilizing a cartridge containing a chelating agent that is slowly released into the water at low concentrations as water flows through. The chelating agent in NuvoH2O is called "Citra-Charge."

Yet another type of scale reduction device is based upon "electrically induced precipitation" which utilizes an electric field to cause precipitation of hardness minerals which then can form on an electrode and must be cleaned periodically. This approach is used in the Judo Biostat 2000 scale reduction device.

There are also a variety of commercial devices based upon magnetic or electromagnetic scale reduction. These devices apply a permanent magnet or electromagnet to pipes, and the magnetic field is claimed to cause hardness precipitation to occur in a form that has less tendency to form an adherent scale.

Another technology to reduce scale utilizes radio waves. A unit containing a ring of ferrites is installed on the outside of a pipe, and an electrical signal is sent from the ring of ferrites to the water inside the pipe, causing the hardness ions to suspend in the water as clusters and inhibiting them from depositing as scale on surfaces.

The various scale reducing devices available for point of use or point of entry hard water treatment have the advantage of being relatively simple, low cost, and not requiring the use of salt. However, they have the disadvantage of only partially "softening" the water, i.e., they primarily deal with only one of the negative aspects of hard water (scale formation) while being less effective or even non-effective in dealing with other negative aspects of hard water such as interference with detergents and spotting on glasses and dishes. This is reflected by highly mixed customer reviews of these devices, indicating that customers with more aggressive hard water or with higher expectations do not find that these scale reducing devices produce water of the same overall quality as that produced by conventional ion exchange water softeners. Furthermore, the available data suggests that these scale reduction technologies have varying effectiveness and while they can reduce scaling tendency they are generally not as effective in eliminating scale as conventional ion exchange water softeners.

Thus, there is a need for systems and methods for treating hard water that are inexpensive, require less handling of salt, discharge less chloride to the environment, and yet still provide water quality comparable to that of a conventional ion exchange water softener.

SUMMARY

There is a need for point of entry and point of use water treatment devices for homes and buildings having hard water that: 1) reduce or eliminate the use of salt or other chemical regenerates in comparison to ion exchange water softeners, 2) have high water use efficiency, and/or 3) produce water of comparable overall quality to currently available ion exchange water softeners. Systems and methods that address these issues are described herein. In an aspect, the systems and methods relate to the coupling of a scale reduction device and a water softener device, for example an ion exchange water softener device. In an aspect, the operation of the water softener device is modified so that it will only remove a portion of the hardness ions present in water being treated. Surprisingly, it has been determined that if a scale reduction device is utilized to reduce the scaling tendency of hard water, and in addition the hard water is also partially softened using a water softener device, the amount of hardness in water that can be tolerated in end use applications is significantly higher than when using a water softener device alone.

A system including both a scale reduction device and a water softener device can produce water having significantly higher than 1 grain per gallon (gpg) hardness ion concentration, but the resulting water can perform comparably to water softened to less than 1 gpg, for example water softened using a conventional ion exchange water softener device and method. In other words, by using a scale reduction device in connection with a water softener device, the amount of hardness ions that need to be removed to achieve acceptable overall water quality is significantly less than when a conventional water softener device is used alone. Thus, by combining a water softener device with a scale reduction device, the water softener device can be modified to only remove as much hardness as needed to obtain acceptable quality water, thereby using less salt or chemical regenerant. Such a system and method can optimize the efficiency of salt use in water softening, minimize the environmental impact of softener chloride discharge, and also reduce the nuisance of purchasing and handling softener salt.

Accordingly, systems and methods for water treatment are described herein. In an aspect, the system is a water treatment system for reducing or eliminating the negative effects of hard water, comprising a water softener device comprising a first inlet for receiving feed water and a first outlet for transferring treated water from the water softener device, and a scale reduction device comprising a second outlet for transferring treated water from the scale reduction device, wherein the scale reduction device is connected to the water softener device via the first outlet. In another aspect, the system is a water treatment system for reducing or eliminating the negative effects of hard water, comprising: a scale reduction device comprising a first inlet for receiving feed water and a first outlet for transferring treated water from the water softener device, and a water softener device comprising a second outlet for transferring treated water from the scale reduction device, wherein the scale reduction device is connected to the water softener device via the first outlet.

The water treatment system may further comprise a bypass conduit. In an aspect, the inlet of the bypass conduit is connected to the first inlet and the outlet of the bypass conduit is connected to the first outlet. The system may further comprise a flow control device connected to the first inlet for directing the flow of feed water to only the water softener device, to only the scale reduction device, or to both the water softener device and the scale reduction device. In an aspect, the inlet of the bypass conduit is connected to the first outlet and the outlet of the bypass conduit is connected to the second outlet. The system may further comprise a flow control device connected to the first outlet for directing the flow of feed water to only the water softener device, to only the scale reduction device, or to both the water softener device and the scale reduction device.

The system may further comprise a flow control valve connected to the bypass conduit for controlling the rate of flow of feed water through the bypass conduit. In an aspect, the system may further comprise a flow control valve connected to the bypass conduit for controlling the rate of flow of feed water from the first inlet, through the bypass conduit, and into the scale reduction device via the first outlet. In an aspect, the system may further comprise a flow control valve connected to the bypass conduit for controlling the rate of flow of feed water from the first inlet, through the bypass conduit, and into the water softener device via the first outlet. In an aspect, the system may further comprise a sensor for sensing the hardness of the water in the second outlet, or for sensing the hardness of the water in any other conduit or component in the system. The system may further comprise a sensor for sensing the pH of the water in the second outlet, or for sensing the pH of the water in any other conduit or component within the system. In an aspect, the system may further comprise a filter. In an aspect, the filter comprises activated carbon. In an aspect, the filter comprises a membrane.

In an aspect, the method is a method for reducing or eliminating the negative effects of hard water, comprising: providing feed water, wherein the feed water comprises hardness ions, transferring at least a first portion of the feed water to a water softener device, wherein the water softener device reduces the concentration of hardness ions in the first portion of feed water to 0 to 20 gpg to provide a partially treated feed water, transferring the partially treated feed water to a scale reduction device, wherein the scale reduction device precipitates and/or flocculates at least a portion of the hardness ions remaining in the partially treated feed water to provide a fully treated water. In another aspect, the method further comprises transferring a second portion of the feed water to the scale reduction device. In an aspect, the method further comprises combining a second portion of the feed water with the partially treated feed water prior to transferring the partially treated feed water to the scale reduction device.

In an aspect, the method is a method for reducing or eliminating the negative effects of hard water, comprising: providing feed water, wherein the feed water comprises hardness ions, transferring at least a first portion of the feed water to a scale reduction device, wherein the scale reduction device precipitates and/or flocculates at least a portion of the hardness ions in the feed water to provide a partially treated feed water, and transferring the partially treated feed water to a water softener device, wherein the water softener device reduces the concentration of dissolved hardness ions in the partially treated feed water to 0 to 20 gpg to provide a fully treated water. In an aspect, the method further comprises transferring a second portion of the feed water to the water softener device. In an aspect, the method further comprises combining a second portion of the feed water with the partially treated feed water prior to transferring the partially treated feed water to the water softener device.

In an aspect, the method further comprises monitoring the hardness of the fully treated water and/or the partially treated water, and adjusting the ratio of the relative amount of water in the first and second portions of water to maintain a predetermined hardness range in the fully treated water. In an aspect, the predetermined hardness range is from about 2 to about 20 gpg hardness ions. In an aspect, the method further comprises monitoring the hardness and pH of the fully treated water and/or the partially treated water, and adjusting the ratio of the relative amount of water in the first and second portions of water to maintain a predetermined Langelier Saturation Index (LSI) range in the fully treated water. In an aspect, the predetermined LSI range is about −1.0 to about 2.0.

In an aspect, the water softener device of the system or method is an ion exchange water softener device. In an aspect, the water softener device of the system or method comprises a strong acid cation exchange resin. In an aspect, the water softener device of the system or method comprises a sulfonated styrene divinylbenzene gel or microporous resin. In an aspect, the water softener device of the system or method comprises a zeolite cation exchange medium. In an aspect, the water softener device of the system or method is regenerated with sodium chloride or potassium chloride. In an aspect, the water softener of the system or method is regenerated with a strong acid.

In an aspect, the water softener device of the system or method is configured or used to reduce the total concentration of hardness ions in the feed water to 0.1 to 20 grains per gallon (gpg), 0 to 0.5 gpg, 0 to 1.0 gpg, 0 to 2.0 gpg, 0 to 5.0 gpg, 0.001 to 1.0 gpg, 0.001 to 2.0 gpg, 0.001 to 5.0 gpg, 0.01 to 1.0 gpg, 0.01 to 2.0 gpg, 0.01 to 5.0 gpg, 0.5 to 5.0 gpg, 1.0 to 5.0 gpg, 1.0 to 10.0 gpg, 1.0 to 20.0 gpg, 1.1 to 2.0 gpg, 1.1 to 5.0 gpg, 1.1 to 10.0 gpg, 1.2 to 2.0 gpg, 1.2 to 5.0 gpg, 1.2 to 10.0 gpg, 1.5 to 5.0 gpg, 1.5 to 10.0 gpg, 1.5 to 20.0 gpg, 2.0 to 5.0 gpg, 2.0 to 10.0 gpg, 2.0 to 20.0 gpg, 2.5 to 5.0 gpg, 2.5 to 10.0 gpg, 2.5 to 20.0 gpg, 3.0 to 5.0 gpg, 3.0 to 10.0 gpg, 3.0 to 20.0 gpg, 4.0 to 10.0 gpg, or 4.0 to 20.0 gpg. In an aspect, the water softener device of the system or method is configured or used to reduce the concentration of dissolved hardness ions in water previously treated by the scale reduction device to 0 to 0.5 gpg, 0 to 1.0 gpg, 0 to 2.0 gpg, 0 to 5.0 gpg, 0.001 to 1.0 gpg, 0.001 to 2.0 gpg, 0.001 to 5.0 gpg, 0.01 to 1.0 gpg, 0.01 to 2.0 gpg, 0.01 to 5.0 gpg, 0.5 to 5.0 gpg, 1.0 to 5.0 gpg, 1.0 to 10.0 gpg, 1.0 to 20.0 gpg, 1.1 to 2.0 gpg, 1.1 to 5.0 gpg, 1.1 to 10.0 gpg, 1.2 to 2.0 gpg, 1.2 to 5.0 gpg, 1.2 to 10.0 gpg, 1.5 to 5.0 gpg, 1.5 to 10.0 gpg, 1.5 to 20.0 gpg, 2.0 to 5.0 gpg, 2.0 to 10.0 gpg, 2.0 to 20.0 gpg, 2.5 to 5.0 gpg, 2.5 to 10.0 gpg, 2.5 to 20.0 gpg, 3.0 to 5.0 gpg, 3.0 to 10.0 gpg, 3.0 to 20.0 gpg, 4.0 to 10.0 gpg, or 4.0 to 20.0 gpg.

In an aspect, the scale reduction device of the system or method induces precipitation of hardness ions. In an aspect, the scale reduction device of the system or method comprises a template assisted crystallization medium to induce precipitation. In an aspect, the scale reduction device of the system or method comprises magnesium oxide to induce precipitation. In an aspect, the scale reduction device of the system or method comprises a non-catalytic, weak acid ion exchange resin to induce precipitation. In an aspect, the scale reduction device of the system or method comprises an electrically induced precipitation cell to induce precipitation on an electrode or electrodes between which a DC or AC potential difference is applied.

In an aspect, the scale reduction device of the system or method comprises a template assisted crystallization medium to induce precipitation. In an aspect, the scale reduction device of the system or method comprises magnesium oxide to induce precipitation. In an aspect, the scale reduction device of the system or method comprises a non-catalytic, weak acid ion exchange resin to induce precipitation. In aspect, the scale reduction device of the system or method comprises an electrically induced precipitation cell to induce precipitation on an electrode or electrodes between which a DC or AC potential difference is applied. In an aspect, the scale reduction device of the system or method imparts a chelating agent or scaling threshold inhibitor to the water. In an aspect, the chelating agent or scaling threshold inhibitor comprises a compound selected from citric acid, citrate salts, sodium hexametaphosphate, EDTA, polyphosphates, phosphonates, amino trimethylenephosphonic acid, 1-hydroxyethylidene-1,1-diphosphonic acid, phosphonobutane-tricarboxylic acid, ethylenediaminetetramethylene phosphonic acid, diethylenetriaminepentamethylene phosphonic acid, bis(hexamethylene) triaminepenta(methylene phosphonic acid), pentaethylenehexamineoctakismethylene phosphonic acid, phosphino-carboxylic acids, homopolymaleic acid, poly(maleic-co-acrylic) acid, polyaspartic acid, polyepoxysuccinic acid, and mixtures thereof. In an aspect, the scale reduction device of the system or method comprises one or more permanent magnets or electromagnets. In an aspect, the permanent magnets or electromagnets are mounted on one or more conduits used for transferring feed water. In an aspect, the permanent magnets or electromagnets are mounted on one or more conduits used for transferring partially treated water. In an aspect, the scale reduction device of the system or method comprises one or more permanent magnets or electromagnets mounted on pipes conveying the mixture of untreated and treated feed water delivered from the first outlet of the water softener.

BRIEF DESCRIPTION OF THE FIGURES

In the drawings, which are not necessarily drawn to scale, like numerals describe substantially similar components throughout the several views. The drawings illustrate generally, by way of example, but not by way of limitation, various embodiments discussed in the present document.

DETAILED DESCRIPTION

Figure 1:
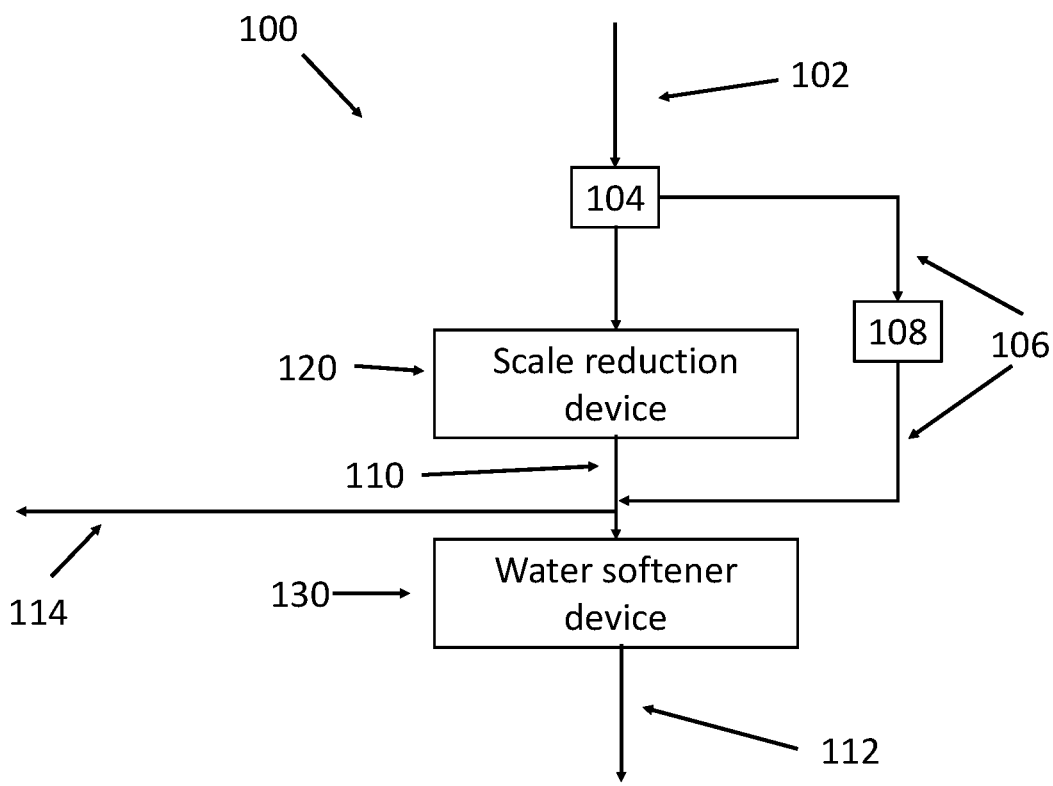
FIG. 1 is a flow diagram illustrating an example of a water treatment system and method.

Disclosed herein are systems and methods for treating water using a combination of a water softener device and a scale reduction device. In an aspect, the water softener device is an ion exchange water softener. In an aspect, these systems and methods can use significantly less chemical regenerant than that required for softening by ion exchange alone, while producing water that performs similarly in end use applications to water that was treated only using an ion exchange water softener alone with typical amounts of chemical regenerant. The use of a scale reduction device reduces the amount of hardness that must be removed from hard water (e.g., by ion exchange softening) to achieve water of acceptable overall quality.

In an aspect, the system includes a) a water softener device that has been modified to provide water containing hardness greater than about 1 gpg but less than the hardness of the feed water, and b) a scale reduction device that reduces the scaling tendency of hard water. The scale reduction device can be either upstream or downstream from the water softener device.

Water Softener Devices

As used herein, the term "water softener" refers to methods and devices that treat hard water by removing hardness ions from the water. Examples of hardness ions include calcium, magnesium, and iron ($Fe^{2+}$). Examples of water softener devices and methods include ion exchange, reverse osmosis, and capacitive deionization.

As discussed above, hard water has a variety of detrimental effects. A variety of technologies exist for reducing the concentration of hardness ions to a level below that which can cause problems. "Soft" water is commonly defined as water containing less than 1 gpg hardness. Water softened to less than 1 gpg is generally considered free of hardness problems for typical residential applications, though even lower hardness may be required for more demanding applications such as industrial boilers. The most commonly used devices for point of entry water softening for homes and buildings are based on either ion exchange or reverse osmosis. While both are very effective at reducing hardness to less than 1 gpg, both also have drawbacks. Reverse osmosis (RO) systems are expensive, have reduced water efficiency, and may require remineralization of the softened water to prevent corrosion. Ion exchange water softeners require users to frequently purchase and handle large bags of salt, which can be a nuisance, and they also discharge chlorides to the environment, contributing to undesirable environmental impact.

Scale Reduction Devices

As used herein, the term "scale reduction" refers to methods and devices that treat hard water by reducing the ability of hardness ions in water to form scale, e.g., through precipitation, flocculation, or threshold precipitation inhibition, without necessarily removing hardness ions from the water. In the case of devices which precipitate the hardness ions, the precipitated hardness ions (or compounds containing the hardness ions) may remain substantially suspended or slurried in the water after treatment by the scale reduction device or method, or they may be precipitated as a "soft scale" onto an electrode, as in electrically induced precipitation. Accordingly, for the purpose of this disclosure, a scale reduction device or method does not include any device or method that removes a significant portion of hardness ions from hard water. Scale reduction devices and methods can be based on several different technological approaches, including physical scale inhibition, chemical scale inhibition, radio wave scale inhibition, and magnetic or electromagnetic scale inhibition. Some of these scale reduction devices and methods do not require salt to inhibit the formation of scale. Examples of scale reduction devices and methods are described below.

Template Assisted Crystallization (TAC) is a technique in which hard water is passed through a medium that induces crystallization of hardness ions, for example, treated ceramic particles containing nucleation sites that induce precipitation of hardness ions or minerals in water in the form of crystals that are too small and/or are of a modified crystal structure that resist forming an adherent scale. Examples of commercial products utilizing this technology include Pelican Natursoft, APEC Futura-10 "Salt-Free Water Softener and Water Conditioner," Aquasana Salt Free Water Conditioner, and OneFlow Plus Salt-Free Scale Prevention system, among others. It should be noted that although the vendors of some products of this type refer to them as "water softeners," they are not true water softeners that actually remove the hardness ions from the water; rather they partially "pre-precipitate" the hardness minerals to reduce their scaling tendency.

Chelation is a technique that uses one or more chemical chelation reagents (also referred to herein as "inhibitors," "chelators," "chelating threshold inhibitors," and the like) to bind or sequester metals, such as hardness ions. In one example of a chelation device and method, hard water is passed through a cartridge containing a medium that releases a chelating agent at a relatively low concentration (i.e., a concentration that functions as a precipitation threshold inhibitor). If the purpose of treating water is just to inhibit scale formation, much lower levels of chemical can be sufficient to achieve that purpose compared to water softeners designed to reduce hardness to less than 1 gpg. The prevention of scale by low, sub-stoichiometric concentrations of additive(s) (which often also function as chelating agents at higher concentrations) is called "threshold inhibition." Threshold inhibition is a kinetic, rather than thermodynamic, effect. It may occur by different mechanisms, such as interference with crystal nucleation or growth and can often be accomplished with very low concentrations of inhibitor, for example 20 ppm or less. The concentration of inhibitor required depends on several factors including the propensity of the water to scale (based on the pH, temperature, hardness, and/or alkalinity of the water), the inhibitor's effectiveness, and the length of time scaling must be prevented. Since threshold inhibition is a kinetic effect, it will not suppress scaling indefinitely. The concentration of inhibitor required for a given level of scaling protection is called the Minimum Inhibitor Concentration (MIC) and typically ranges between about 0.5 and 20 ppm.

A variety of chelating threshold inhibitors are known, though the ones most commonly used in scale reduction devices for residential and building use include citric acid, citrates, polyphosphates, or a combination thereof. Examples of commercial products utilizing chelating technology include the NuvoH2O™ Home Softener System and the Aquios® Water Softener, among others. While chelation devices are also sometimes referred to as "water softeners" they are distinguishable from true softener devices that actually remove hardness ions from the water.

Magnetic or electromagnetic scale inhibition is characterized by devices and methods that use a permanent magnet or electromagnet mounted on household or building pipes. The magnetic field is thought to reduce the scaling tendency of the hard water. It has been suggested that the magnetic field induces precipitation of very small particles of calcium carbonate which remain suspended in the water rather than growing directly on surfaces as a scale. Commercial devices of this type include the Scalewatcher 3 Electronic Descaler and the Eddy® Electronic Water Descaler, among others. In an aspect, the scale reduction device can be one or more magnets or electromagnets that are connected to a pipe, conduit, tank, or any other part of a water treatment system that is used to hold or transfer water within the system. The magnets or electromagnets can be used to apply a magnetic or electromagnetic field to water in the system to reduce scaling.

Electrically Induced Precipitation is a technique that utilizes an electric field to cause precipitation of hardness minerals from the water which then form on an electrode that must be cleaned periodically. The Judo Biostat 2000 scale reduction device is one commercial product based on this technology.

In addition to the commercial scale reduction technologies and systems discussed above, other scale reduction approaches have also been described. U.S. Pat. No. 6,258,250, which is incorporated by reference herein in its entirety, describes a scale reduction device utilizing an electrolysis chamber, applying a reversible DC or AC potential difference across two electrodes, and reversing the polarity, thereby producing a treated hard water having a significantly reduced tendency to form scale. U.S. Pat. No. 9,896,364, which is incorporated by reference herein in its entirety, describes a method in which hard water is passed through a bed or cartridge of magnesium oxide, which is said to act as a "conversion agent," causing precipitation of calcium carbonate in the aragonite form, which does not cause scale formation, rather than calcite form. In their recent paper, "Removal and/or prevention of limescale in plumbing tubes by a radio-frequency alternating electric field inductance device" (*Journal of Water Processing Engineering*, 22, 2018, p. 34-40), Georgiou et. al. describe an electronic device which reduces limescale formation by induction of a Radio-Frequency Alternating Electric Field in water at a specific range of frequency and antenna voltage, along with its distinct sinewave waveform, which is reported to change the way minerals precipitate, reducing scale by producing instead a non-adherent mineral powder in the bulk water. Yet another method is described in "Softening Hard Water Using High Frequency Spark Plasma Discharge" (*Plasma Chemistry and Plasma Processing*, 37 (1), 2017, p. 99-114), in which a high frequency spark plasma discharge applied to hard water induces pre-precipitation of the hardness minerals from the water.

In U.S. Pat. No. 9,879,120, which is incorporated by reference herein in its entirety, Koslow describes a non-catalytic, scale control ion exchange resin that causes hardness ions to precipitate from water in the form of small, stable calcite crystals that do not tend to form an adherent scale on surfaces.

In U.S. Pat. No. 9,896,364, Smith describes a method for reducing the negative effects of water hardness for use in cleaning applications by passing the hard water through an exhausted ion exchange resin, i.e., the resin is incapable or substantially incapable of performing ion exchange but which sheds a threshold agent such as an acrylic acid polymer or methacrylic acid polymer followed by a second water treatment agent consisting of an oxide or hydroxide compound of a metal such as magnesium, aluminum, or titanium.

In U.S. patent application publication no. 2020/0331786, which is incorporated by reference herein in its entirety, Monsrud describes a water treatment composition for reducing the detrimental effects of hard water comprising a substantially exhausted weak acid cation exchange resin that is a crosslinked acrylic acid polymer and/or methacrylic acid polymer and which does not conduct significant ion exchange. It is suggested that the ion exchange resin functions by providing a substantially low molecular weight polymer material to the water such as a polyacrylate material with a molecular weight between 150 and 100,000. Accordingly, for the purpose of this disclosure, a scale reduction device can be a device including an ion exchange resin, provided that hardness ions are not significantly removed via ion exchange using such a device, and instead the ion exchange resin is used to cause precipitation of hardness ions.

While numerous technologies have been developed and adapted for use in commercial devices to reduce the scaling tendency of hard water, it is noteworthy that these technologies have not substantially displaced the use of conventional ion exchange water softeners. This is most likely because many of these technologies reduce, but do not eliminate, the scaling tendency of hard water. The effectiveness of these technologies can vary depending on the scaling aggressiveness of the hard water, which can depend on factors such as pH, total hardness, and alkalinity. Furthermore, these scale reduction devices do not provide all of the benefits of water softened to less than 1 gpg hardness. In addition to protecting hot water appliances from scale damage, home and building owners also look to conventional water softening to alleviate a variety of other nuisance and aesthetic problems caused by hard water, such as clogging of shower heads, loss of detergent effectiveness, and spotting of glassware and dishes.

Water Treatment Systems

The present disclosure relates to water treatment systems and methods, specifically systems and methods useful for reducing or eliminating the negative effects of hard water. These systems and methods use significantly less salt than ion exchange water softeners alone while producing treated water having comparable performance quality to treated water produced by such water softeners.

FIG. 1 is a diagram of an exemplary water treatment system and method. Water treatment system 100 includes a scale reduction device 120 and a water softener device 130. Scale reduction device 120 can be any type of scale reduction device, as described herein. Water softener device 130 can be any type of water softener device as described herein, for example an ion exchange water softener device. Further, systems 100 or 200 can include more than one scale reduction device 120 and/or more than one water softener device 130. When multiple scale reduction or water softener devices are used, each device can be the same type of device or they can be different types of devices. For example, when two scale reduction devices are used, the first scale reduction device can be a TAC device, while the second scale reduction device can be one or more electromagnets connected to the feed water conduit.

In an aspect, water treatment system 100 is configured to provide an inlet conduit 102 for receiving feed water and conveying the feed water to scale reduction device 120. Outlet conduit 110 of scale reduction device 120 conveys treated feed water to water softener device 130. In an aspect, water softener device 130 is configured to reduce the hardness of the water exiting water softening device 130 to a hardness ion concentration value greater than 1 gpg, but less than the hardness of the feed water. In an aspect, the treated water exiting water softener device 130 via outlet 112 has a dissolved hardness ion concentration of greater than 1.0 gpg, 1.5 gpg, 2.0 gpg, 3.0 gpg, 4.0 gpg, or 5.0 gpg. In an aspect, the treated water exiting water softener device 130 via outlet 112 has a dissolved hardness ion concentration in the range of 0 to 0.5 gpg, 0 to 1.0 gpg, 0 to 2.0 gpg, 0 to 5.0 gpg, 0.001 to 1.0 gpg, 0.001 to 2.0 gpg, 0.001 to 5.0 gpg, 0.01 to 1.0 gpg, 0.01 to 2.0 gpg, 0.01 to 5.0 gpg, 0.1 to 20.0 gpg, 0.5 to 5.0 gpg, 1.0 to 5.0 gpg, 1.0 to 10.0 gpg, 1.0 to 20.0 gpg, 1.5 to 5.0 gpg, 1.5 to 10.0 gpg, 1.5 to 20.0 gpg, 2.0 to 5.0 gpg, 2.0 to 10.0 gpg, 2.0 to 20.0 gpg, 2.5 to 5.0 gpg, 2.5 to 10.0 gpg, 2.5 to 20.0 gpg, 3.0 to 5.0 gpg, 3.0 to 10.0 gpg, 3.0 to 20.0 gpg, 4.0 to 10.0 gpg, or 4.0 to 20.0 gpg. Therefore, the treated water in outlet 112 has a reduced hardness ion concentration compared to the feed water entering inlet 102, but a greater hardness ion concentration compared to treated water produced using a conventional ion exchange water softener, which typically produces water having a hardness ion concentration of less than 1.0 gpg. Further, the treated water in outlet 112 is produced using significantly less salt than a conventional ion exchange water softener, but has comparable performance quality compared to water treated with a conventional ion exchange water softener.

In an aspect, water treatment system 100 can also include a bypass conduit 106 that can convey water from inlet conduit 102 to outlet conduit 110 of scale reduction device 120. In an aspect, a flow control valve 108 can be connected to bypass conduit 106 to control the rate or amount of water conveyed from inlet conduit 102 to outlet conduit 110. In an aspect, water treatment system 100 can also include a flow control device 104 that can be connected to inlet conduit 102 for directing the flow of feed water to only scale reduction device 120, the flow of feed water to only water softener device 130, or a portion of the flow of feed water to both scale reduction device 120 and water softener device 130. Accordingly, flow control device 104 and/or flow control valve 108 can be used to control the proportion and/or rate of flow of feed water to both scale reduction device 120 and water softener device 130. This control of the relative proportion and/or rate of flow of feed water to the scale reduction device 120 and water softener device 130 can be used to optimize performance of water treatment system 100. For example, if the feed water in inlet 102 has a relatively low hardness ion concentration, then the scale reduction device can be bypassed, in whole or in part. Further, if the hardness ion concentration of the feed water in inlet 102 is relatively high, then a greater proportion (or all) of the feed water in inlet 102 can be sent directly to scale reduction device 120.

Figure 2:
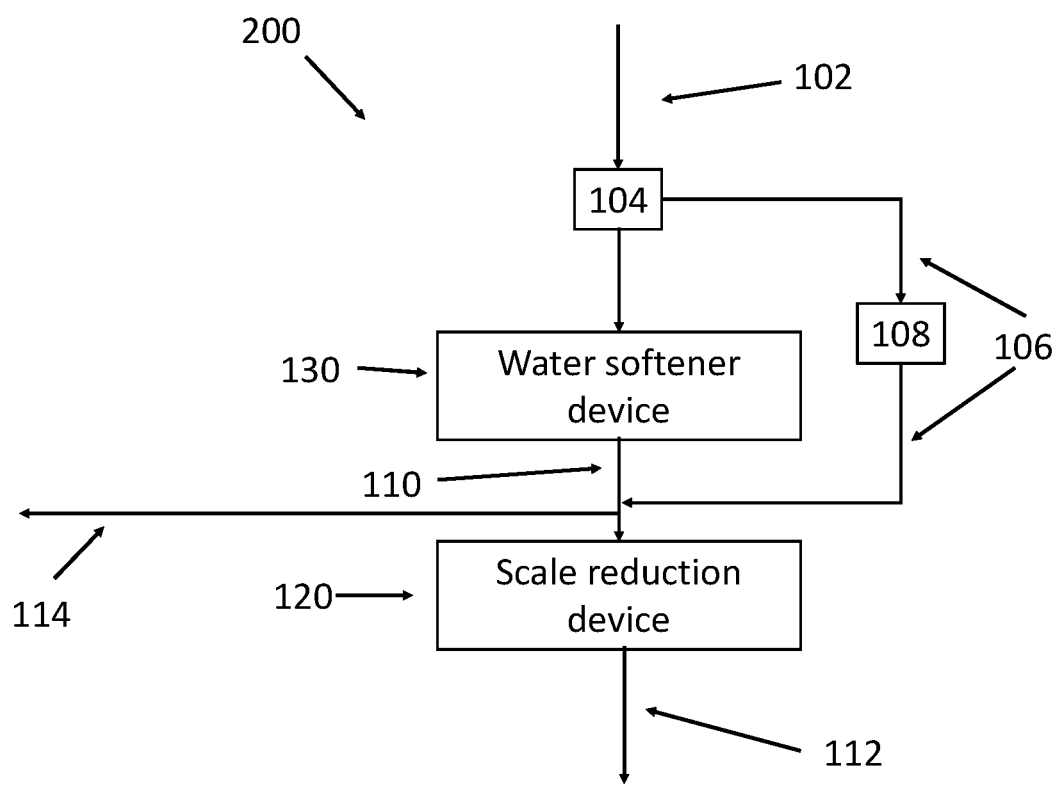
FIG. 2 is a flow diagram illustrating another example of a water treatment system and method.

FIG. 2 is a diagram of another exemplary water treatment system and method. Water treatment system 200 includes a scale reduction device 120 and a water softener device 130. Water treatment system 200 differs from water treatment system 100 in that water softener device 130 in system 200 is configured to receive feed water first, and then water is conveyed to scale reduction device 120. In other words, water softener device 130 in system 200 is connected to directly to inlet conduit 102, while outlet conduit 110 conveys water from water softener device 130 to scale reduction device 120.

In an aspect, water softener device 130 of system 200 is configured to reduce the hardness of the water exiting water softening device 130 to a hardness ion concentration value greater than 1 gpg, but less than the hardness of the feed water. In an aspect, the treated water exiting water softener device 130 via outlet 110 has a hardness ion concentration of greater than 1.0 gpg, 1.5 gpg, 2.0 gpg, 3.0 gpg, 4.0 gpg, or 5.0 gpg. In an aspect, the treated water exiting water softener device 130 via outlet 110 has a hardness ion concentration in the range of 0 to 0.5 gpg, 0 to 1.0 gpg, 0 to 2.0 gpg, 0 to 5.0 gpg, 0.001 to 1.0 gpg, 0.001 to 2.0 gpg, 0.001 to 5.0 gpg, 0.01 to 1.0 gpg, 0.01 to 2.0 gpg, 0.01 to 5.0 gpg, 0.1 to 20.0 gpg, 0.5 to 5.0 gpg, 1.0 to 5.0 gpg, 1.0 to 10.0 gpg, 1.0 to 20.0 gpg, 1.5 to 5.0 gpg, 1.5 to 10.0 gpg, 1.5 to 20.0 gpg, 2.0 to 5.0 gpg, 2.0 to 10.0 gpg, 2.0 to 20.0 gpg, 2.5 to 5.0 gpg, 2.5 to 10.0 gpg, 2.5 to 20.0 gpg, 3.0 to 5.0 gpg, 3.0 to 10.0 gpg, 3.0 to 20.0 gpg, 4.0 to 10.0 gpg, or 4.0 to 20.0 gpg. In an aspect, the at least partially treated water in outlet 110 has a reduced hardness ion concentration compared to the feed water entering inlet 102, but a greater hardness ion concentration compared to treated water produced using a conventional ion exchange water softener with a typical amount of chemical regenerant, which typically produces water having a hardness ion concentration of less than 1.0 gpg. Further, the fully treated water in outlet 112 is produced using significantly less salt (i.e., chemical regenerant) than a conventional ion exchange water softener, but has comparable performance quality compared to water treated with a conventional ion exchange water softener.

Figure 3:
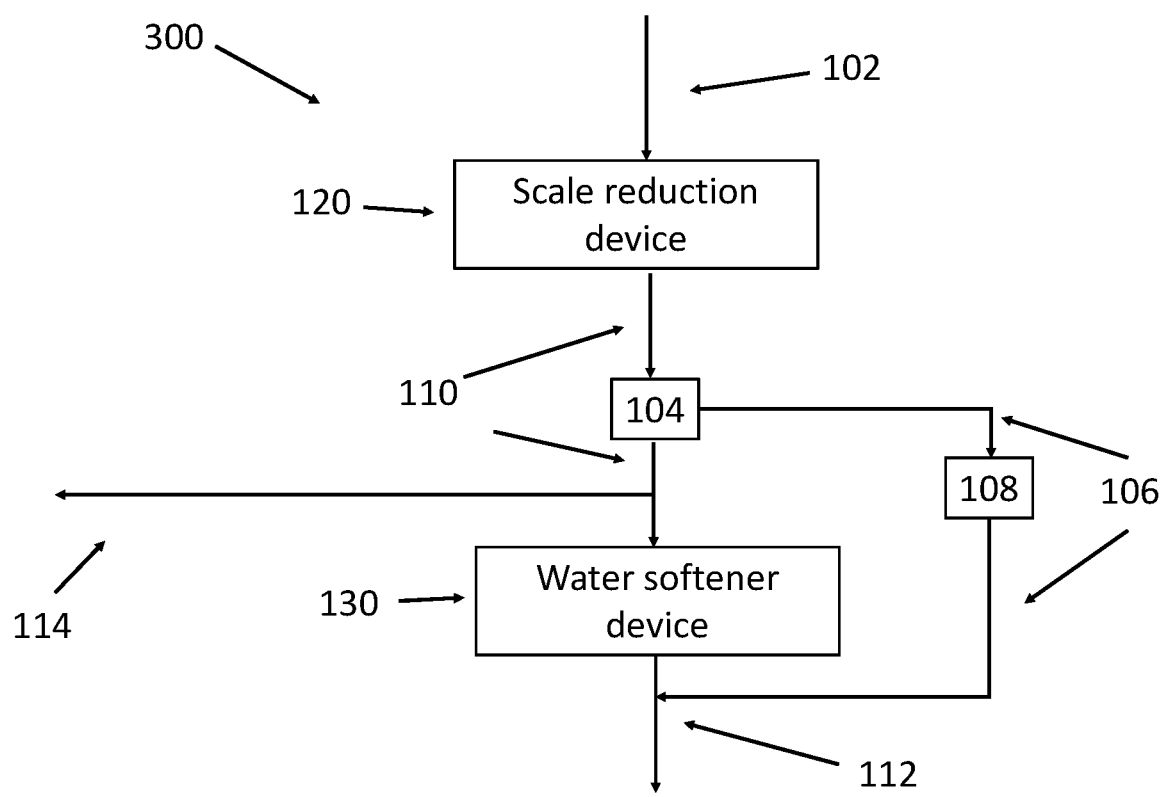
FIG. 3 is a flow diagram illustrating another example of a water treatment system and method.

FIG. 3 is a diagram of yet another exemplary water treatment system 300, which is similar to water treatment system 100 except that bypass conduit 106, flow control device 104, and flow control valve 108 are used to bypass water softener device 130, in whole or in part, instead of scale reduction device 120. In such an aspect, a portion of partially treated water in conduit 110 can bypass water softener device 130 via conduit 106. The portion of untreated water can be combined with treated water exiting water softener device 130 in conduit 110, prior to exiting the system via conduit 112. Bypass 106 and associated components 104 and/or 108 can be used to blend a ratio of partially treated feed water with treated feed water, for example, to produce a treated water that has a hardness ion concentration within a desired range. In an aspect, bypass conduit 106 and associated components 104 and/or 108 can be used to produce water having a hardness ion concentration greater than 1 gpg but less than the concentration in the feed water, or to produce water with a hardness ion concentration within any of the ranges described above. Further, bypass 106 can be useful when, for example, the concentration of hardness ions in the feed water is already relatively low and does not need to be treated using a water softener device. In an aspect, the treated water exiting water softener device 130 via outlet 112 in system 300 has a dissolved hardness ion concentration in the range of 0.5 to 5.0 gpg, 1.0 to 5.0 gpg, 1.0 to 10.0 gpg, 1.0 to 20.0 gpg, 1.5 to 5.0 gpg, 1.5 to 10.0 gpg, 1.5 to 20.0 gpg, 2.0 to 5.0 gpg, 2.0 to 10.0 gpg, 2.0 to 20.0 gpg, 2.5 to 5.0 gpg, 2.5 to 10.0 gpg, 2.5 to 20.0 gpg, 3.0 to 5.0 gpg, 3.0 to 10.0 gpg, 3.0 to 20.0 gpg, 4.0 to 10.0 gpg, or 4.0 to 20.0 gpg.

Figure 4:
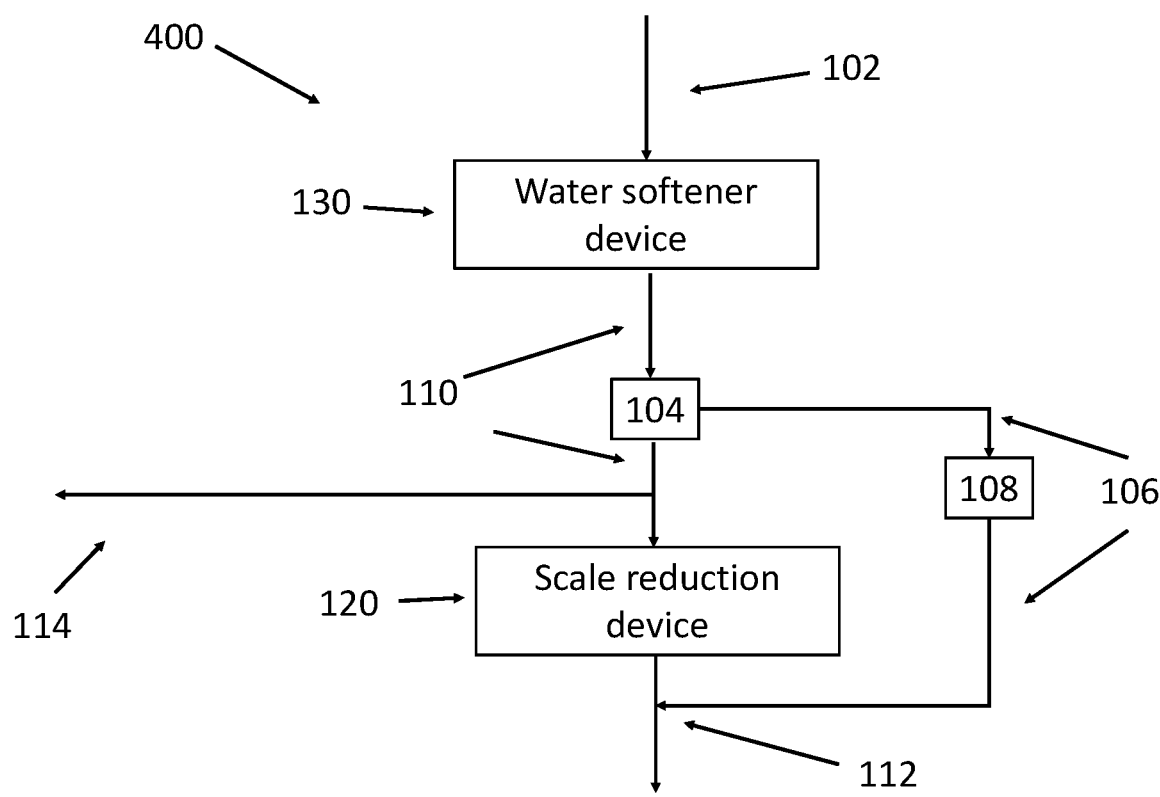
FIG. 4 is a flow diagram illustrating another example of a water treatment system and method.

Similarly, as shown in FIG. 4, system 400 is the same as system 200 except that bypass conduit 106 and associated components 104 and 108 are used to bypass water softener device 130 instead of scale reduction device 120. In an aspect, it is to be understood that water treatment systems 100, 200, 300, or 400 can also exclude any or all of bypass conduit 106, a flow control device 104, and a flow control valve 108. In an aspect, the treated water exiting water softener device 130 via outlet 110 in system 400 has a hardness ion concentration in the range of 0.5 to 5.0 gpg, 1.0 to 5.0 gpg, 1.0 to 10.0 gpg, 1.0 to 20.0 gpg, 1.5 to 5.0 gpg, 1.5 to 10.0 gpg, 1.5 to 20.0 gpg, 2.0 to 5.0 gpg, 2.0 to 10.0 gpg, 2.0 to 20.0 gpg, 2.5 to 5.0 gpg, 2.5 to 10.0 gpg, 2.5 to 20.0 gpg, 3.0 to 5.0 gpg, 3.0 to 10.0 gpg, 3.0 to 20.0 gpg, 4.0 to 10.0 gpg, or 4.0 to 20.0 gpg.

It is to be understood that water treatment systems 100, 200, 300, and 400 can also include sensor(s), transducer(s), controller(s), microprocessor(s), valve(s), pump(s) or any other components necessary for controlling, directing, and/or automating the rate or volume of flow in any of conduits 102, 106, 110, 112, or 114. Controlling the rate or volume of flow in those conduits provides a way to control the gpg of hardness ions and/or degree of scale reduction in the fully treated water produced by systems 100, 200, 300, and 400, which can be used to maintain the desired performance quality of the fully treated water while minimizing the use of chemical regenerant in an ion exchange water softener device and/or minimizing energy usage of the water softener device or scale reduction device.

In an aspect, water treatment systems 100, 200, 300, and 400 can also include a conduit 114 that connects to outlet conduit 110 and can be used to convey treated water from scale reduction device (in systems 100 and 300) or water softener device (in systems 200 and 400) to the point of use. Conduit 114 may also include a flow control valve (not shown). Accordingly, conduit 114 may be used to bypass the water softener device (in systems 100 and 300) or the scale reduction device (in systems 200 and 400), which can be desirable if the water in conduit 110 is already at an acceptable performance quality.

In an aspect, water treatment systems 100, 200, 300, and 400 can further include one or more water purification filters. Such filters can be used to remove particulates and aggregates not removed by other components of the system (s). The one or more water purification filters can be based on any technology, for example, filters based on membranes, screens, meshes, or any other mechanical techniques, and filters utilizing media such as activated carbon or sand. Further, the one or more filters used at any location within systems 100, 200, 300, and 400. In an aspect, one or more filters are used to filter the feed water entering the system in conduit 102. In an aspect, one or more filters are used in a location within systems 100, 200, 300, 400 that is immediately after scale reduction device 120. In an aspect, one or more filters are used in a location within systems 100, 200, 300, 400 that is immediately before water softener device 120. In an aspect, one or more filters are used in systems 100 or 300 to remove at least a portion of particulates or aggregates resulting from the operation of scale reduction device 120 prior to partially treated water being transferred to water softener device 130. In such an aspect, it is to be understood that the filter can reduce or eliminate the amount of particulates or aggregates having a particle size in a range that may cause clogging or otherwise interfere with the operation of water softener 120. In such an aspect, when water softener device 120 is an ion exchange water softener device, the filter can reduce or eliminate the amount of particulates or aggregates having a particle size in a range that may cause clogging or fouling of the ion exchange resin.

In an aspect, scale reduction device 120 includes a cartridge or medium or chemical dosing pump that dispenses or provides a method of contacting a chelating agent or scale threshold inhibitor to the water. In an aspect, scale reduction device 120 includes or is connected to a reservoir that can be used to hold a chelating agent or inhibitor solution. In such an aspect, the chelating agent or inhibitor solution can be dispensed into water for treatment purposes via a metering pump or via other means such as by gravity. The chelating agent or scale threshold inhibitor is a chemical that will reduce the scaling severity of water. In an aspect, the chelating agent or scale threshold inhibitor can be selected from compounds or compositions comprising Siliphos®, Slow-Phos (produced by SPER Chemical Corporation), citric acid, citrate salts, sodium hexametaphosphate, EDTA, polyphosphates, phosphonates, amino trimethylenephosphonic acid, 1-hydroxyethylidene-1,1-diphosphonic acid, phosphonobutane-tricarboxylic acid, ethylenediaminetetramethylene phosphonic acid, diethylenetriaminepentamethylene phosphonic acid, bis(hexamethylene) triaminepenta(methylene phosphonic acid), pentaethylenehexamineoctakismethylene phosphonic acid, phosphino-carboxylic acids, homopolymaleic acid, poly (maleic-co-acrylic) acid, polyaspartic acid, polyepoxysuccinic acid, polyacrylic acid, polymethacrylic add, or a mixture of any of the above.

In an aspect, scale reduction device 120 utilizes Template Assisted Crystallization TAC) (sometimes called Nucleation Assisted Crystallization). In an aspect, scale reduction device 120 includes a TAC medium that provides nucleation sites which catalyze the crystallization of calcium carbonate as nano- or micro-crystals. In an aspect, the TAC medium can be selected from Eagle®sorb ES3 Anti-Scale, One-Flow®, Next™ Scale Stop, and Filtersorb® SP3.

In an aspect, scale reduction device 120 utilizes a cartridge or medium containing magnesium oxide to induce precipitation of hardness ions. In an aspect, scale reduction device 120 utilizes a non-catalytic, weak acid ion exchange resin to induce precipitation of hardness ions. In an aspect, the non-catalytic weak acid ion exchange resin used to precipitate hardness ions is that described in U.S. Pat. No. 9,879,120, which is incorporated by reference herein in its entirety. In an aspect, scale reduction device 120 utilizes electrically induced precipitation of hardness ions in which water is passed through a cell between electrodes across which an electrical potential is applied, inducing precipitation of hardness minerals on the electrode.

In an aspect, scale reduction device 120 utilizes an exhausted weak acid cation exchange resin which cannot perform significant ion exchange. In an aspect, the weak acid cation exchange resin can be a crosslinked acrylic acid polymer or crosslinked methacrylic acid polymer. In an aspect, the weak acid cation exchange resin can introduce a substantially low molecular weight polymer material to the water such as a polyacrylate material with a molecular weight between 150 and 100,000.

In an aspect, scale reduction device 120 utilizes a metering pump which directly meters a solution of a chemical chelanting agent or threshold inhibitor to the water. In an aspect, the chelating agent or scale threshold inhibitor can be selected from compounds or compositions comprising Siliphos®, Slow-Phos (produced by SPER Chemical Corporation), citric acid, citrate salts, sodium hexametaphosphate, EDTA, polyphosphates, phosphonates, amino trimethylenephosphonic acid, 1-hydroxyethylidene-1,1-diphosphonic acid, phosphonobutane-tricarboxylic acid, ethylenediaminetetramethylene phosphonic acid, diethylenetriaminepentamethylene phosphonic acid, bis(hexamethylene) triaminepenta(methylene phosphonic acid), pentaethylenehexamineoctakismethylene phosphorate acid, phosphino-carboxylic acids, homopolymaleic acid, poly(maleic-co-acrylic) acid, polyaspartic acid, polyepoxysuccinic acid, polyacrylic acid, polymethacrylic acid, or a mixture of any of the above.

In an aspect, water softener device 130 is an ion exchange water softener that utilizes a strong acid cation exchange resin. In an aspect, the strong acid cation exchange resin can be a sulfonated styrene-divinylbenzene gel or microporous resin. In an aspect, the ion exchange water softener utilizes a zeolite cation exchange medium.

In an aspect, the ratio of untreated feed water to partially treated water at outlet 110 is a function of the total hardness of the untreated water. In an aspect, the ratio of untreated feed water to partially treated water at outlet 110 is a function of the total hardness of the untreated water and other water properties optionally including pH, carbonate alkalinity, calcium hardness, water temperature, and total dissolved solids. In an aspect, the ratio of untreated feed water to treated water at outlet 110 can be manually adjusted to provide a finished treated water of acceptable quality.

In an aspect, the pressure of feed water at inlet 102, blended water at outlet 110, and/or fully treated water at outlets 112 or 114 is monitored by pressure sensors and one or more controllers. In an aspect, controller 104 and/or flow control valve 108 can be used to control the relative amount of water sent to bypass conduit 106 and/or rate of flow of water in conduits 102 or 106, in response to pressure values provided by the pressure sensors.

In an aspect, sensors can be used to monitor properties of the feed water, such as pH, carbonate alkalinity, calcium hardness, total hardness, total dissolved solids, and/or temperature, and a controller in communication with the sensors can operate flow controller 104 and/or flow control valve 108 in order to provide a finished treated water of acceptable quality.

In an aspect, systems 100, 200, 300, and 400 can determine the Langelier Saturation Index (LSI) from parameters measured on the fully or partially treated water. The LSI is a calculated quantity that indicates whether a given source of water is or is not saturated in $CaCO_3$ and therefore whether the water will precipitate $CaCO_3$ (super saturated, LSI>0), will dissolve $CaCO_3$ (under saturated, LSI<0), or is completely stable (saturated, LSI=0). The LSI can be determined from measurements of the water pH, temperature, total dissolved solids, calcium hardness, and carbonate alkalinity. LSI=pH (the measured pH of the water)–pHs (the pH at saturation). See also U.S. Pat. No. 9,061,924, which is incorporated by reference herein in its entirety.

Water Treatment Methods

In one aspect, the water treatment method includes the following steps. The feed water to be treated, which contains an undesirable amount of hardness ions, is transferred to a water softener to produce a treated water stream having a reduced hardness ion concentration, for example a hardness ion concentration greater than 1 gpg, but less than the concentration of the feed water. This treated water stream is transferred to a scale reduction device, which further treats the water to reduce scale forming tendency, resulting in a fully treated water stream having a hardness ion concentration greater than 1 gpg, but nonetheless having acceptable quality for the desired end use application.

Alternatively, a portion of the feed water is transferred to the water softener while the remaining portion of the feed water bypasses the water softener via a bypass conduit. The water treated by the water softener is then combined with the water in the bypass conduit before being transferred to the scale reduction device. In an aspect, the water treated by the water softener has a hardness ion concentration of less than 1 gpg, while the concentration of hardness ions in the combined treated and bypass stream is greater than 1 gpg. It is to be understood that the ratio of the amount of water treated by the water softener and the amount of water bypassing the water softener can be adjusted to optimize the quality of the fully treated water produced by scale reduction device.

In an aspect, the quality of the fully treated water is determined and maintained by measuring the hardness ion concentration and/or LSI of the fully treated water, and by adjusting the relative flow rate of water entering the water softener device and the bypass conduit, and/or by adjusting the level of treatment performed in the water softener device. For example, the level of treatment performed in the water softener device can be adjusted to produce water having a hardness ion concentration of less than 1 gpg, or of greater than 1 gpg but less than the concentration in the feed water. In an aspect, the quality of the fully treated water is determined and maintained by measuring and maintaining the hardness ion concentration and/or LSI of the water entering the scale reduction device instead of the fully treated water. In an aspect, the quality of the fully treated water is determined and maintained by also measuring the hardness ion concentration and/or LSI of the feed water and taking into account fluctuations in the characteristics of the feed water in addition to the performance of the water softener and/or scale reduction device.

In an aspect, the sequence or placement of the water softener and scale reduction device can be reversed, i.e., the feed water is transferring first to the scale reduction device and then to the water softener device. In such a method, a bypass conduit can be used to bypass the water softener device, as described above.

In such a method, the water softener can remove at least a portion of the remaining dissolved hardness ions, after the feed water has been treated by the scale reduction device, to achieve a dissolved hardness ion concentration of less than 1 gpg, while allowing any precipitated or chelated hardness ions to remain suspended in the water and pass through to the conduit containing the fully treated water. In such a method, the water hardness is calculated only on the basis of dissolved ion content and does not include the hardness contribution from precipitated $CaCO_3$ (or other minerals) suspended in the water. Accordingly, in an aspect, the fully treated water can contain less than 1 gpg dissolved hardness ion concentration, but may contain significantly higher than 1 gpg total hardness ion concentration when including the hardness ion content associated with the hardness ions that are precipitated, chelated, or otherwise sequestered by the scale reduction device.

EXAMPLES

The invention is further described in detail by reference to the following examples. These examples are provided for purposes of illustration only and are not intended to be limiting unless otherwise specified. Thus, the invention should in no way be construed as being limited to the following examples, but rather should be construed to encompass any and all variations which become evident as a result of the teaching provided herein.

Example 1

Tests were run on a bench scale water heater to determine the effect of treating hard water with a) water conditioner alone (treatment with low concentrations of sodium tripolyphosphate (STTP) as a threshold scale inhibitor), b) partial water softening (reducing the total hardness of the feed water by 25% or 50%) alone, and c) a combination of partial water softening and water conditioner treatment at reducing scale formation within the water heater compared to untreated hard water. Tests were run using synthetic hard water ($3.20 \times 10^{-3}$ M $CaCl_2 \cdot 2H_2O$ and $3.30 \times 10^{-3}$ M $NaHCO_3$— equivalent to a water hardness of 320 mg/L as $CaCO_3$) and synthetic softened water ($3.30 \times 10^{-3}$ M $NaHCO_3$ and $3.20 \times 10^{-3}$ M NaCl). Synthetic hard water and synthetic soft water were mixed to achieve water equivalent to 25% and 50% softened water. In the scaling test, 1.5 L of water was heated to 85° C. using a 1600 W heating element plugged into a temperature controller to maintain the temperature for 3 hours. The location (heating element, wall of container, and bulk water) and quantity of precipitated scale was quantified by dissolution in 6% acetic acid and Ca analysis of the resulting solution by ICP. Results of the bench scale water heater tests are given in Table 1. Standard deviations are listed parenthetically.

TABLE 1

| Treatment | Number of Test Replicates | Water Hardness (mg/L $CaCO_3$) | STTP concentration (mg/L) | Average % Reduction in Total Scale |
|---|---|---|---|---|
| Control | 3 | 320 | 0 | — |
| 25% softened alone | 3 | 240 | 0 | 20 (12) |
| 50% softened alone | 3 | 160 | 0 | 47 (13) |
| Chelation alone | 6 | 320 | 0.05 | 64 (17) |
| Chelation alone | 3 | 320 | 0.10 | 86 (11) |
| 25% softened + chelation | 3 | 240 | 0.05 | 87 (8) |
| 25% softened + chelation | 3 | 240 | 0.10 | 96.7 (1.4) |
| 50% softened + chelation | 6 | 160 | 0.05 | 96.9 (1.3) |

The data in Table 1 illustrate that treating hard water with both partial water softening and a conditioning treatment of low concentrations of STPP results in greater water heater scale reduction than either treatment alone. Starting with water containing 320 mg/L hardness (18.7 gpg, which is generally to be considered very hard), softening by 50% alone reduced water heater scale by 47%, treatment with 0.05 mg/L STTP alone reduced water heater scale by 64%, but the two in combination reduced water heater scale by 97%. And by raising the STTP concentration slightly to just 0.10 mg/L, it was possible to achieve 97% water heater scale reduction even with water that was only 25% softened. ANOVA analysis indicated that the differences in water heater scale between the combination of 50% water softening and treatment with 0.05 mg/L STTP conditioning and either of those treatments alone was statistically significant at $p<0.05$.

Example 2

Another common problem caused by hard water is spotting, e.g. of glass shower doors and glasses in dishwashers. Tests were run to determine the effect of treating hard water with a) water conditioner alone (0.2 ppm STTP as described above), b) partial water softening (reducing the total hardness of the feed water by 50% alone, and c) a combination of partial water softening and 0.2 ppm STTP at glass spotting. For this test, the same synthetic hard water and partially softened water compositions as described above were used. 20 gallons of synthetic water was well mixed and stored in an insulated container. The water was heated to 65.5° C. in an electric tank-type water heater (A.O. Smith EJC-6) with a 220 WPSI heating element. The gate valve at the hot water output was used to control the flow rate and the solenoid valve was used to control the cycle of 10 seconds on; 78 seconds off. The flow rate and pressure were adjusted by changing the pump speed and opening or closing the gate valve to achieve a flowrate of 6.8 mL/s±0.5 mL/s. The pressure within the system was always maintained above 10 psi. 5 feet of ¼-inch ID clear vinyl tubing was attached to the end of the heater output (after the solenoid valve) and a 4 inch×4 inch piece of glass was placed at the output of the tubing at a 45° angle and exposed to flow of the hot water for 1 hour. After 1 hour, the glass was removed from the output of coil tubing and allowed to dry for at least 24 hours. After drying, the glass sheet was placed under a black box with a small slit on the right-hand side of the bottom to allow light to come through and a photograph was taken though a small hole on the top of the black box, permitting a clear picture with no glare. The photo was cropped to 2 inch×2 inch square (1 inch cropped from each side) and converted to a black and white jpg file. The jpg file was then analyzed using a MATLAB program to quantify the number of pixels in each photo that were dark, medium-dark, medium light, and light. Results of the test are given in Table 2, which gives the percent area of the glass with heavy spotting (defined as the lightest/whitest portion) for the different test conditions. It can be seen that both 50% softening alone or treatment of the hard water with 0.2 ppm STTP alone resulted in only partial reduction of glass spotting, but 50% softening of the water combined with 0.2 ppm STTP treatment resulted in nearly complete elimination of glass spotting.

TABLE 2

| Test Condition | % Area of Glass with Heavy Spotting | % Reduction in Heavily Spotted Glass Area |
| --- | --- | --- |
| Glass with no water exposure | 0 | |
| Hard water control (no softening, no STTP) | 47 | |
| 50% softened water only | 14 | 70 |
| 0.2 ppm STTP only | 26 | 45 |
| 50% softened water + 0.2 ppm STTP | 2 | 96 |

Additional Examples

The following examples are provided, the numbering of which is not to be construed as designating levels of importance:

Example 1 provides a water treatment system for reducing or eliminating the negative effects of hard water, comprising:
a water softener device comprising a first inlet for receiving feed water and a first outlet for transferring treated water from the water softener device, and
a scale reduction device comprising a second outlet for transferring treated water from the scale reduction device,
wherein the scale reduction device is connected to the water softener device via the first outlet.

Example 2 provides a water treatment system for reducing or eliminating the negative effects of hard water, comprising:
a scale reduction device comprising a first inlet for receiving feed water and a first outlet for transferring treated water from the water softener device, and
a water softener device comprising a second outlet for transferring treated water from the scale reduction device,
wherein the scale reduction device is connected to the water softener device via the first outlet.

Example 3 provides the water treatment system of examples 1 or 2, further comprising a bypass conduit, wherein the inlet of the bypass conduit is connected to the first inlet and the outlet of the bypass conduit is connected to the first outlet.

Example 4 provides the system of any of the preceding examples, further comprising a flow control device connected to the first inlet for directing the flow of feed water to only the water softener device, to only the scale reduction device, or to both the water softener device and the scale reduction device.

Example 5 provides the system of any of the preceding examples, further comprising a flow control valve connected to the bypass conduit for controlling the rate of flow of feed water from the first inlet, through the bypass conduit, and into the scale reduction device via the first outlet.

Example 6 provides the system of any of the preceding examples, further comprising a flow control valve connected to the bypass conduit for controlling the rate of flow of feed water from the first inlet, through the bypass conduit, and into the water softener device via the first outlet.

Example 7 provides the system of any of the preceding examples, further comprising a sensor for sensing the hardness of the water in the second outlet.

Example 8 provides the system of any of the preceding examples, further comprising a sensor for sensing the pH of the water in the second outlet.

Example 9 provides the system of any of the preceding examples, wherein the water softener device is an ion exchange water softener device Example 10 provides the system of any of the preceding examples, wherein the water softener device comprises a strong acid cation exchange resin.

Example 11 provides the system of any of the preceding examples, wherein the water softener device comprises a sulfonated styrene divinylbenzene gel or microporous resin.

Example 12 provides the system of any of the preceding examples, wherein the water softener device comprises a zeolite cation exchange medium.

Example 13 provides the system of any of the preceding examples, wherein the scale reduction device induces precipitation of hardness ions.

Example 14 provides the system of any of the preceding examples, wherein the scale reduction device comprises a template assisted crystallization medium to induce precipitation of hardness ions.

Example 15 provides the system of any of the preceding examples, wherein the scale reduction device comprises magnesium oxide to induce precipitation of hardness ions.

Example 16 provides the system of any of the preceding examples, wherein the scale reduction device comprises a non-catalytic, weak acid ion exchange resin to induce precipitation of hardness ions.

Example 17 provides the system of any of the preceding examples, wherein the scale reduction device comprises a weak acid ion exchange resin for providing an effective amount of a polymer comprising polyacrylate to the water in the scale reduction device, wherein the polymer comprising polyacrylate has a molecular weight in the range of 150 to 100,000.

Example 18 provides the system of example 17, wherein the weak acid ion exchange resin is substantially incapable of performing ion exchange (i.e., substantially exhausted).

Example 19 provides the system of any of the preceding examples, wherein the scale reduction device comprises an electrically induced precipitation cell to induce precipitation on an electrode or electrodes between which a DC or AC potential difference is applied.

Example 20 provides the system of any of the preceding examples, wherein the scale reduction device imparts a chelating agent or scaling threshold inhibitor to the water.

Example 21 provides the system of any of the preceding examples, wherein the chelating agent or scaling threshold inhibitor comprises a compound selected from citric acid, citrate salts, sodium hexametaphosphate, EDTA, polyphosphates, phosphonates, amino trimethylenephosphonic acid, 1-hydroxyethylidene-1, 1-diphosphonic acid, phosphonobutane-tricarboxylic acid, ethylenediaminetetramethylene phosphonic acid, diethylenetriaminepentamethylene phosphonic acid, bis(hexamethylene) triaminepenta(methylene phosphonic acid), pentaethylenehexamineoctakismethylene phosphonic acid, phosphino-carboxylic acids, homopolymaleic acid, poly(maleic-co-acrylic) acid, polyaspartic acid, polyepoxysuccinic acid, and mixtures thereof.

Example 22 provides the system of any of the preceding examples, wherein the scale reduction device comprises one or more permanent magnets or electromagnets mounted on pipes conveying the mixture of untreated and treated feed water delivered from the first outlet of the water softener.

Example 23 provides the system of any of the preceding examples, wherein the water softener device is configured to reduce the concentration of hardness ions in the feed water or treated water from the scale reduction device to 0.1 to 20 grains per gallon (gpg); 0 to 0.5 gpg, 0 to 1.0 gpg, 0 to 2.0 gpg, 0 to 5.0 gpg, 0.001 to 1.0 gpg, 0.001 to 2.0 gpg, 0.001 to 5.0 gpg, 0.01 to 1.0 gpg, 0.01 to 2.0 gpg, 0.01 to 5.0 gpg, 0.5 to 5.0 gpg, 1.0 to 5.0 gpg, 1.0 to 10.0 gpg, 1.0 to 20.0 gpg, 1.1 to 2.0 gpg, 1.1 to 5.0 gpg, 1.1 to 10 gpg, 1.2 to 2.0 gpg, 1.2 to 5.0 gpg, 1.2 to 10.0 gpg, 1.5 to 5.0 gpg, 1.5 to 10.0 gpg, 1.5 to 20.0 gpg, 2.0 to 5.0 gpg, 2.0 to 10.0 gpg, 2.0 to 20.0 gpg, 2.5 to 5.0 gpg, 2.5 to 10.0 gpg, 2.5 to 20.0 gpg, 3.0 to 5.0 gpg, 3.0 to 10.0 gpg, 3.0 to 20.0 gpg, 4.0 to 10.0 gpg, or 4.0 to 20.0 gpg.

Example 24 provides the system of any of the preceding examples, wherein the water softener device is configured to reduce the concentration of dissolved hardness ions in the feed water or treated water from the scale reduction device to 0 to 0.5 gpg, 0 to 1.0 gpg, 0 to 2.0 gpg, 0 to 5.0 gpg. 0.001 to 1.0 gpg, 0.001 to 2.0 gpg, 0.001 to 5.0 gpg, 0.01 to 1.0 gpg, 0.01 to 2.0 gpg, 0.01 to 5.0 gpg, 0.1 to 20 gpg, 0.5 to 5.0 gpg, 1.0 to 5.0 gpg, 1.0 to 10.0 gpg, 1.0 to 20.0 gpg, 1.1 to 2.0 gpg, 1.1 to 5.0 gpg, 1.1 to 10.0 gpg, 1.2 to 2.0 gpg, 1.2 to 5.0 gpg, 1.2 to 10.0 gpg, 1.5 to 5.0 gpg, 1.5 to 10.0 gpg, 1.5 to 20.0 gpg, 2.0 to 5.0 gpg, 2.0 to 10.0 gpg, 2.0 to 20.0 gpg, 2.5 to 5.0 gpg, 2.5 to 10.0 gpg, 2.5 to 20.0 gpg, 3.0 to 5.0 gpg, 3.0 to 10.0 gpg, 3.0 to 20.0 gpg, 4.0 to 10.0 gpg, or 4.0 to 20.0 gpg.

Example 25 provides the system of any of the preceding examples, further comprising a filter.

Example 26 provides the system of example 25, wherein the filter comprises activated carbon.

Example 27 provides a method for reducing or eliminating the negative effects of hard water, comprising:
providing feed water, wherein the feed water comprises hardness ions,
transferring at least a first portion of the feed water to a water softener device, wherein the water softener device reduces the concentration of hardness ions in the first portion of feed water to 0 to 20 gpg to provide a partially treated feed water,
transferring the partially treated feed water to a scale reduction device, wherein the scale reduction device precipitates and/or flocculates at least a portion of the hardness ions remaining in the partially treated feed water to provide a fully treated water.

Example 28 provides the method of example 27, further comprising transferring a second portion of the feed water to the scale reduction device.

Example 29 provides the method of example 27, further comprising combining a second portion of the feed water with the partially treated feed water prior to transferring the partially treated feed water to the scale reduction device.

Example 30 provides a method for reducing or eliminating the negative effects of hard water, comprising:
providing feed water, wherein the feed water comprises hardness ions,
transferring at least a first portion of the feed water to a scale reduction device, wherein the scale reduction device precipitates and/or flocculates at least a portion of the hardness ions in the feed water to provide a partially treated feed water, and
transferring the partially treated feed water to a water softener device, wherein the water softener device reduces the concentration of dissolved hardness ions in the partially treated feed water to 0 to 20 gpg to provide a fully treated water.

Example 31 provides the method of example 30, further comprising transferring a second portion of the feed water to the water softener device.

Example 32 provides the method of example 30, further comprising combining a second portion of the feed water with the partially treated feed water prior to transferring the partially treated feed water to the water softener device.

Example 33 provides the method of any of the preceding examples, further comprising monitoring the hardness of the fully treated water and/or the partially treated water, and adjusting the ratio of the relative amount of water in the first and second portions of water to maintain a predetermined hardness range in the fully treated water.

Example 34 provides the method of example 33, wherein the predetermined hardness range is from about 2 to about 20 gpg hardness ions.

Example 35 provides the method of any of the preceding examples, further comprising monitoring the hardness and pH of the fully treated water and/or the partially treated water, and adjusting the ratio of the relative amount of water in the first and second portions of water to maintain a predetermined Langelier Saturation Index (LSI) range in the fully treated water.

Example 36 provides the method of example 35, wherein the predetermined LSI range is about −1.0 to about 2.0.

Example 37 provides the method of any of the preceding examples, wherein the water softener device is an ion exchange water softener device.

Example 38 provides the method of any of the preceding examples, wherein the water softener device is regenerated with sodium chloride or potassium chloride.

Example 39 provides the method of any of the preceding examples, wherein the water softener is regenerated with a strong acid.

Example 40 provides the method of any of the preceding examples, wherein the scale reduction device comprises a template assisted crystallization medium to induce precipitation.

Example 41 provides the method of any of the preceding examples, wherein the scale reduction device comprises magnesium oxide to induce precipitation.

Example 42 provides the method of any of the preceding examples, wherein the scale reduction device comprises a non-catalytic, weak acid ion exchange resin to induce precipitation.

Example 43 provides the method of any of the preceding examples, wherein the scale reduction device comprises an electrically induced precipitation cell to induce precipitation on an electrode or electrodes between which a DC or AC potential difference is applied.

Example 44 provides the method of any of the preceding examples, wherein the scale reduction device imparts a chelating agent or scaling threshold inhibitor to the water.

Example 45 provides the method of any of the preceding examples, wherein the chelating agent or scaling threshold inhibitor comprises a compound selected from citric acid, citrate salts, sodium hexametaphosphate, EDTA, polyphosphates, phosphonates, amino trimethylenephosphonic acid, 1-hydroxyethylidene-1, 1-diphosphonic acid, phosphonobutane-tricarboxylic acid, ethylenediaminetetramethylene phosphonic acid, diethylenetriaminepentamethylene phosphonic acid, bis(hexamethylene) triaminepenta(methylene phosphonic acid), pentaethylenehexamineoctakismethylene phosphonic acid, phosphino-carboxylic acids, homopolymaleic acid, poly(maleic-co-acrylic) acid, polyaspartic acid, polyepoxysuccinic acid, and mixtures thereof.

Example 46 provides the method of any of the preceding examples, wherein the scale reduction device comprises one or more permanent magnets or electromagnets.

Example 47 provides the method of example 46, wherein the permanent magnets or electromagnets are mounted on one or more conduits used for transferring feed water.

Example 47 provides the method of example 46, wherein the permanent magnets or electromagnets are mounted on one or more conduits used for transferring partially treated water.

Example 48 provides the method of any of the preceding examples, wherein the water softener device is configured to reduce the concentration of hardness ions in the feed water or partially treated water to 0.1 to 20 grains per gallon (gpg); 0 to 0.5 gpg, 0 to 1.0 gpg, 0 to 2.0 gpg, 0 to 5.0 gpg, 0.001 to 1.0 gpg, 0.001 to 2.0 gpg, 0.001 to 5.0 gpg, 0.01 to 1.0 gpg, 0.01 to 2.0 gpg, 0.01 to 5.0 gpg, 0.5 to 5.0 gpg, 1.0 to 5.0 gpg, 1.0 to 10.0 gpg, 1.0 to 20.0 gpg, 1.1 to 2.0 gpg, 1.1 to 5.0 gpg, 1.1 to 10 gpg, 1.2 to 2.0 gpg, 1.2 to 5.0 gpg, 1.2 to 10.0 gpg, 1.5 to 5.0 gpg, 1.5 to 10.0 gpg, 1.5 to 20.0 gpg, 2.0 to 5.0 gpg, 2.0 to 10.0 gpg, 2.0 to 20.0 gpg, 2.5 to 5.0 gpg, 2.5 to 10.0 gpg, 2.5 to 20.0 gpg, 3.0 to 5.0 gpg, 3.0 to 10.0 gpg, 3.0 to 20.0 gpg, 4.0 to 10.0 gpg, or 4.0 to 20.0 gpg.

Example 49 provides the method of any of the preceding examples, wherein the water softener device is configured to reduce the concentration of dissolved hardness ions in the feed water or partially treated water to 0 to 0.5 gpg, 0 to 1.0 gpg, 0 to 2.0 gpg, 0 to 5.0 gpg, 0.001 to 1.0 gpg, 0.001 to 2.0 gpg, 0.001 to 5.0 gpg, 0.01 to 1.0 gpg, 0.01 to 2.0 gpg, 0.01 to 5.0 gpg, 0.1 to 20.0 gpg, 0.5 to 5.0 gpg, 1.0 to 5.0 gpg, 1.0 to 10.0 gpg, 1.0 to 20.0 gpg, 1.1 to 2.0 gpg, 1.1 to 5.0 gpg, 1.1 to 10.0 gpg, 1.2 to 2.0 gpg, 1.2 to 5.0 gpg, 1.2 to 10.0 gpg, 1.5 to 5.0 gpg, 1.5 to 10.0 gpg, 1.5 to 20.0 gpg, 2.0 to 5.0 gpg, 2.0 to 10.0 gpg, 2.0 to 20.0 gpg, 2.5 to 5.0 gpg, 2.5 to 10.0 gpg, 2.5 to 20.0 gpg, 3.0 to 5.0 gpg, 3.0 to 10.0 gpg, 3.0 to 20.0 gpg, 4.0 to 10.0 gpg, or 4.0 to 20.0 gpg.

What is claimed is:

1. A water treatment system for reducing or eliminating the negative effects of hard water, comprising:
a water softener device comprising a first inlet for receiving feed water and a first outlet for transferring treated water from the water softener device,
a scale reduction device comprising a second outlet for transferring treated water from the scale reduction device,
wherein the scale reduction device is connected to the water softener device via the first outlet, and
a flow control device connected to the first inlet, wherein the flow control device is configured to direct a first portion of a flow of feed water to only the scale reduction device and a second portion of the flow to both the water softener device and the scale reduction device.

2. The water treatment system of claim 1, further comprising a bypass conduit, wherein an inlet of the bypass conduit is connected to the first inlet and an outlet of the bypass conduit is connected to the first outlet.

3. The system of claim 2, wherein the flow control device comprises a flow control valve connected to the bypass conduit, and
wherein the flow control valve is configured to direct a portion of the flow of feed water from the first inlet, through the bypass conduit, and into the scale reduction device via the first outlet.

4. The system of claim 1, wherein the water softener device is an ion exchange water softener device.

5. The system of claim 1, wherein the scale reduction device is configured to induce precipitation of hardness ions.

6. The system of claim 1, wherein the water softener device is configured to reduce a concentration of hardness ions in the feed water to 0.1 to 20 grains per gallon (gpg).

7. The system of claim 1, wherein the water softener device is configured to reduce a concentration of dissolved hardness ions in the feed water to 0.1 to 20 grains per gallon (gpg).

8. A water treatment system for reducing or eliminating the negative effects of hard water, comprising:
a scale reduction device comprising a first inlet for receiving feed water and a first outlet for transferring treated water from the scale reduction device, and
a water softener device comprising a second outlet for transferring treated water from the water softener device, wherein the water softener device excludes a reverse osmosis water softener device,
wherein the scale reduction device is connected to the water softener device via the first outlet,
a bypass conduit, wherein an inlet of the bypass conduit is connected to the first inlet and an outlet of the bypass conduit is connected to the first outlet, and
a flow control valve connected to the bypass conduit, wherein the flow control valve is configured to direct a portion of a flow of the feed water from the first inlet, through the bypass conduit, and into the water softener device via the first outlet.

9. The system of claim 8, wherein the water softener device is configured to reduce a concentration of hardness ions in the feed water or treated water from the scale reduction device to 0.1 to 20 grains per gallon (gpg).

10. The system of claim 8, wherein the water softener device is configured to reduce a concentration of dissolved hardness ions in the feed water or treated water from the scale reduction device to 0.1 to 20 grains per gallon (gpg).

11. The system of claim 8, wherein the water softener device is an ion exchange water softener device or a capacitive deionization water softener device.

12. A water treatment system for reducing or eliminating the negative effects of hard water, comprising:
- a water softener device comprising a first inlet for receiving feed water and a first outlet for transferring treated water from the water softener device,
- a scale reduction device comprising a second outlet for transferring treated water from the scale reduction device, wherein the scale reduction device is connected to the water softener device via the first outlet,
- a bypass conduit, wherein an inlet of the bypass conduit is connected to the first inlet and an outlet of the bypass conduit is connected to the first outlet, and
- a flow control valve connected to the bypass conduit wherein the flow control valve is configured to direct a portion of a flow of the feed water from the first inlet, through the bypass conduit, and into the scale reduction device via the first outlet.

* * * * *